(12) United States Patent
Springett et al.

(10) Patent No.: US 6,234,171 B1
(45) Date of Patent: May 22, 2001

(54) MOLDED RESPIRATOR CONTAINING SORBENT PARTICLES

(75) Inventors: James E. Springett, Hudson, WI (US); Leonard W. Barrett, Maplewood; Roberta C. Harper, St. Joseph's Township, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/568,731

(22) Filed: May 11, 2000

Related U.S. Application Data

(62) Division of application No. 08/982,119, filed on Dec. 1, 1997, now Pat. No. 6,102,039.

(51) Int. Cl.[7] .................................................. A62B 7/10
(52) U.S. Cl. ............................... 128/206.12; 128/206.21
(58) Field of Search ...................... 156/157, 159, 156/245; 128/206.12, 206.19, 206.17, 206.21, 206.28, 205.25, 205.27

(56) References Cited

U.S. PATENT DOCUMENTS

| | | |
|---|---|---|
| Re. 31,285 | 6/1983 | van Turnhout et al. ............... 55/155 |
| 2,988,469 | 6/1961 | Watson ................................. 154/101 |
| 3,801,400 | 4/1974 | Vogt et al. ........................... 156/167 |
| 3,825,379 | 7/1974 | Lohkamp et al. ...................... 425/72 |
| 3,849,241 | 11/1974 | Butin et al. ........................... 161/169 |
| 3,954,697 | 5/1976 | McConnell et al. ................. 526/350 |
| 3,971,373 | 7/1976 | Braun ................................. 128/146.2 |
| 4,072,812 | 2/1978 | McConnell et al. ............. 526/348.2 |
| 4,103,058 | 7/1978 | Humlicek .............................. 428/171 |
| 4,215,682 | 8/1980 | Kubik et al. ..................... 128/205.29 |
| 4,379,201 | 4/1983 | Heilmann et al. .................... 428/345 |
| 4,384,577 | 5/1983 | Huber et al. .................... 128/206.19 |
| 4,429,001 | 1/1984 | Kolpin et al. ........................ 428/283 |
| 4,454,881 | 6/1984 | Huber et al. ..................... 128/206.15 |
| 4,536,440 | 8/1985 | Berg ...................................... 428/284 |
| 4,554,324 | 11/1985 | Husman et al. ...................... 525/301 |
| 4,619,979 | 10/1986 | Kotnour et al. ........................ 526/88 |
| 4,684,576 | 8/1987 | Tabor et al. .......................... 428/441 |
| 4,729,371 | 3/1988 | Krueger et al. ................. 128/206.19 |
| 4,737,559 | 4/1988 | Kellen et al. ......................... 526/291 |
| 4,741,949 | 5/1988 | Morman et al. ..................... 428/224 |
| 4,797,318 | 1/1989 | Brooker et al. ...................... 428/283 |

(List continued on next page.)

FOREIGN PATENT DOCUMENTS

| | | | |
|---|---|---|---|
| 7-185249 | 7/1995 | (JP) ............................... B01D/53/04 |
| WO 81/01019 | 4/1981 | (WO) ............................. D04H/13/00 |

OTHER PUBLICATIONS

"Polycarb–Active composite" *Textile Asia*, vol. 28, No. 10, Oct. 1997, pp. 147–148.

Wente, Van A., "Superfine Thermoplastic Fibers", *Industrial Engineering Chemistry*, vol. 48, pp. 1342–1346.

Wente, Van A. et al., "Manufacturing of Superfine Organic Fibers", Report No. 4364 of the Naval Research Laboratories, published May 25, 1954.

*Primary Examiner*—Glenn K. Dawson
*Assistant Examiner*—Teena Mitchell
(74) *Attorney, Agent, or Firm*—David R. Cleveland

(57) ABSTRACT

Molded respirators containing an air-permeable, sorbent-particle-containing layer between air-permeable particle-retaining layers. The particle-containing layer is stretchable during shaping without tearing or significant loss of particles. At least some of the fibers in the particle-containing layer are sufficiently tacky after being formed by themselves into a particle-free web and cooled to room temperature so that the web will adhere to itself. The respirators can be molded from flat webs without the need to fabricate the particle-containing layer into a shaped preform.

5 Claims, 4 Drawing Sheets

U.S. PATENT DOCUMENTS

| | | | |
|---|---|---|---|
| 4,807,619 | 2/1989 | Dyrud et al. | 128/206.16 |
| 4,843,134 | 6/1989 | Kotnour et al. | 526/318.4 |
| 4,873,972 | 10/1989 | Magidson et al. | 128/206.12 |
| 4,883,052 | 11/1989 | Weiss et al. | 128/205.27 |
| 5,149,468 | 9/1992 | Hershelman | 264/12 |
| 5,190,812 | 3/1993 | Joseph et al. | 428/297 |
| 5,238,733 | 8/1993 | Joseph et al. | 428/284 |
| 5,248,455 | 9/1993 | Joseph et al. | 264/6 |
| 5,258,220 | 11/1993 | Joseph | 428/284 |
| 5,306,545 | 4/1994 | Shirayanagi et al. | 428/198 |
| 5,307,796 | 5/1994 | Kronzer et al. | 128/206.16 |
| 5,382,400 | 1/1995 | Pike et al. | 264/168 |
| 5,400,780 | 3/1995 | Nishino | 128/205.27 |
| 5,462,538 | 10/1995 | Korpman | 604/372 |
| 5,486,410 | 1/1996 | Groeger et al. | 428/283 |
| 5,496,507 | 3/1996 | Angadjivand et al. | 264/423 |
| 5,506,279 | 4/1996 | Babu et al. | 522/34 |
| 5,560,878 | 10/1996 | Dragoo et al. | 264/115 |
| 5,601,851 | 2/1997 | Terakawa | 425/72.2 |
| 5,637,646 | 6/1997 | Ellis | 525/309 |
| 5,641,555 | 6/1997 | Berrigan et al. | 428/152 |
| 5,645,057 | 7/1997 | Watt et al. | 128/206.12 |
| 5,656,368 | 8/1997 | Braun et al. | 428/141 |
| 5,662,728 | 9/1997 | Groeger | 96/153 |
| 5,674,339 | 10/1997 | Groeger et al. | 156/145 |
| 5,696,199 * | 12/1997 | Senkus et al. | 524/548 |
| 5,763,078 * | 6/1998 | Braun et al. | 428/365 |
| 5,830,311 * | 11/1998 | Braun et al. | 156/471 |
| 5,883,026 * | 3/1999 | Reader et al. | 442/382 |
| 5,952,420 * | 9/1999 | Senkus et al. | 524/548 |
| 6,007,914 | 12/1999 | Joseph et al. | 428/391 |

* cited by examiner

MOLDED RESPIRATOR CONTAINING SORBENT PARTICLES

This is a divisional of application Ser. No. 08/982,119 filed Dec. 1, 1997 U.S. Pat. No. 6,102,039.

FIELD OF THE INVENTION

This invention relates to shaped fibrous respirators which can be worn to protect the wearer or surrounding personnel against air pollutants and other airborne agents, and to processes for producing such respirators. This invention also relates to multilayer shaped respirators that contain active sorbent particles in one or more of the respirator layers.

BACKGROUND OF THE INVENTION

Disposable cup-shaped multilayer fibrous respirators are described, for example, in U.S. Pat. No. 4,536,440 (Berg), U.S. Pat. No. 4,807,619 (Dyrud et al.), and U.S. Pat. No. 5,307,796 (Kronzer et al). Respirators for protection against nuisance gases or vapors typically contain one or more fibrous web layers containing sorbent particles such as activated carbon or alumina, and are described, for example, in U.S. Pat. No. 3,971,373 (Braun), U.S. Pat. No. 4,384,577 (Huber et al.), U.S. Pat. No. 4,454,881 (Huber et al.), U.S. Pat. No. 4,729,371 (Krueger et al.), and U.S. Pat. No. 4,873,972 (Magidson et al.).

Fibrous webs containing sorbent particles have been employed for a variety of other uses including vacuum cleaner bags, diapers and oil sorbents. Patents mentioning such particle-containing fibrous webs include U.S. Pat. No. 2,988,469 (Watson), U.S. Pat. No. 3,801,400 (Vogt et al.), U.S. Pat. No. 5,149,468 (Hershelman), U.S. Pat. No. 5,486,410 (Groeger et al.), U.S. Pat. No. 5,662,728 (Groeger), and International Application No. WO 97/30199 (Danaklon A/S et al.). Elastomeric or extensible webs containing particulate materials are described in U.S. Pat. No. 4,741,949 (Morman et al.), U.S. Pat. No. 5,190,812 (Joseph et al.), U.S. Pat. No. 5,238,733 (Joseph et al.), U.S. Pat. No. 5,258,220 (Joseph et al.), U.S. Pat. No. 5,248,455 (Joseph et al.), and U.S. Pat. No. 5,560,878 (Dragoo et al.). Pillowed microfiber webs containing sorbent particles are described in U.S. Pat. No. 4,103,058 (Humlicek). A particle-laden meltblown material said to be useful for gas/vapor filtering and/or absorbing, and specifically for disposable vacuum cleaner bags, is described in U.S. Pat. No. 4,797,318 (Brooker et al.). A particle-laden coating employing pressure-sensitive adhesive microfibers said to be useful for absorbent products, such as sanitary napkins, pantyliners, incontinence products, diapers and to such related absorbent products, is described in U.S. Pat. No. 5,462,538 (Korpman).

SUMMARY OF THE INVENTION

The above-mentioned U.S. Pat. No. 3,971,373 avers that particle-loaded microfiber sheet products may be incorporated into cup-like molded respirators "in the same ways as conventional non-particle-loaded web are included" (Col. 7, lines 31 et seq.). The assignee of the present invention has found it difficult reliably to mold respirators from web sheet materials containing high particle loading levels. The particles tend to drop from the web during handling or storage, thereby leading to waste and dust formation. In addition, the molding step can cause the web to tear or the particles to become consolidated or otherwise redistributed within the respirator, thereby creating regions having lower particle loading, and sometimes causing unexpectedly early respirator failure.

Web tearing, and particle loss, consolidation or redistribution can be reduced by welding together two particle-containing layers along a sinusoidal weld line, and then cutting and opening the resulting welded part to form a substantially cup-shaped preform. A similar procedure using non-particle-containing filtration layers is described in Example 22 of the above mentioned U.S. Pat. No. 4,807,619. The shape-retaining layers of the respirator are molded in mating male and female mold halves. The opened preform is then draped over the molded shape-retaining layers and welded or otherwise assembled to the molded layers to form the finished respirator. Converting processes employing such a preform exhibit fewer tears, thin spots and lost particles than converting processes involving molding of a conventional flat particle-containing web. However, formation of the preform requires extra manufacturing machinery and process steps, and causes undesirable material waste.

The present invention provides, in one aspect, a respirator comprising multiple layers including an air-permeable sorbent-particle-containing layer between air-permeable particle-retaining layers, at least one of the layers of such respirator being a shape-retaining layer, wherein the particle-containing layer has a generally cup-like shape, the particle-containing layer was stretchable during shaping to such cup-like shape without tearing or significant loss of particles, and at least some of the fibers in the particle-containing layer are sufficiently tacky after being formed by themselves into a particle-free web and cooled to room temperature so that the web will adhere to itself.

The present invention provides, in another aspect, a method for making such respirators.

DETAILED DESCRIPTION

Figure 1:
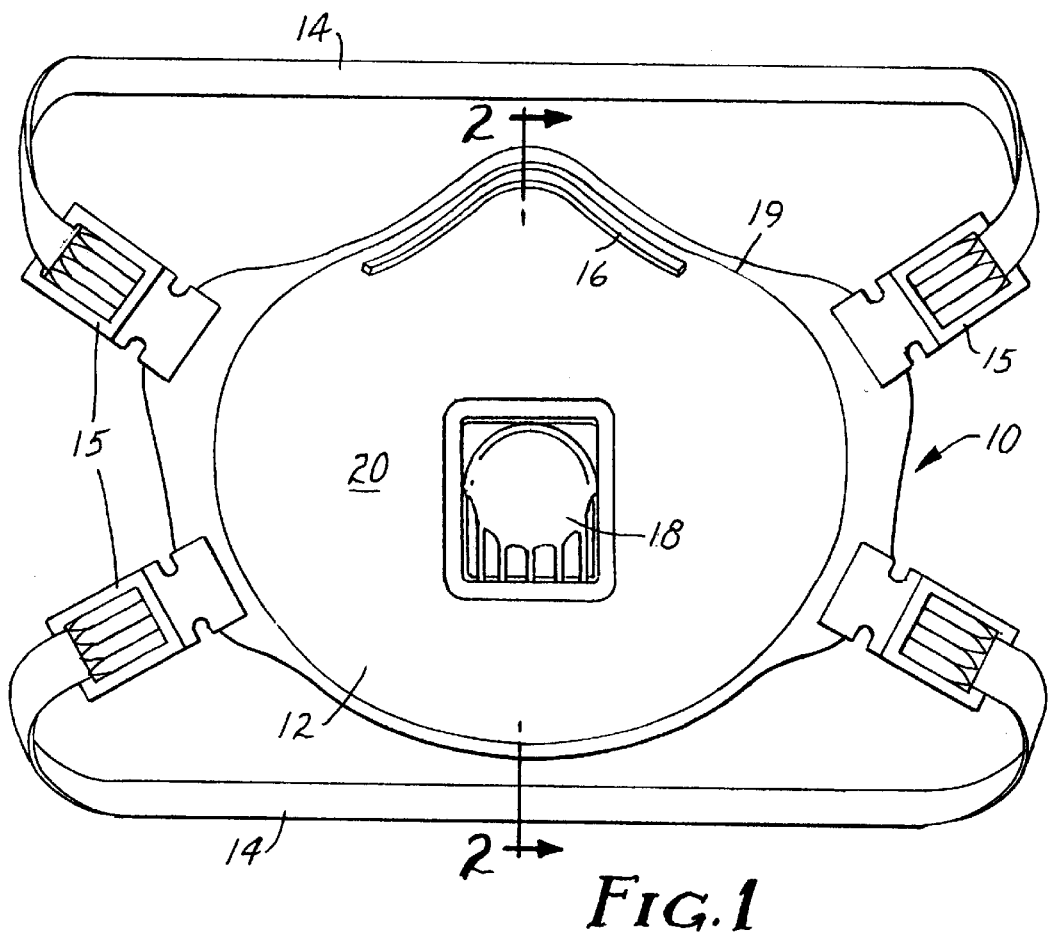
FIG. 1 is a front view of a respirator of the invention.

Referring to FIG. 1, respirator 10 has a shell or respirator body 12, elastic bands 14 held in place by releasable tabs 15 of plastic or other flexible material, a pliable dead-soft nose band 16 of a metal such as aluminum and an exhalation valve 18. Edge weld 19 holds the layers of the respirator together.

Figure 2:
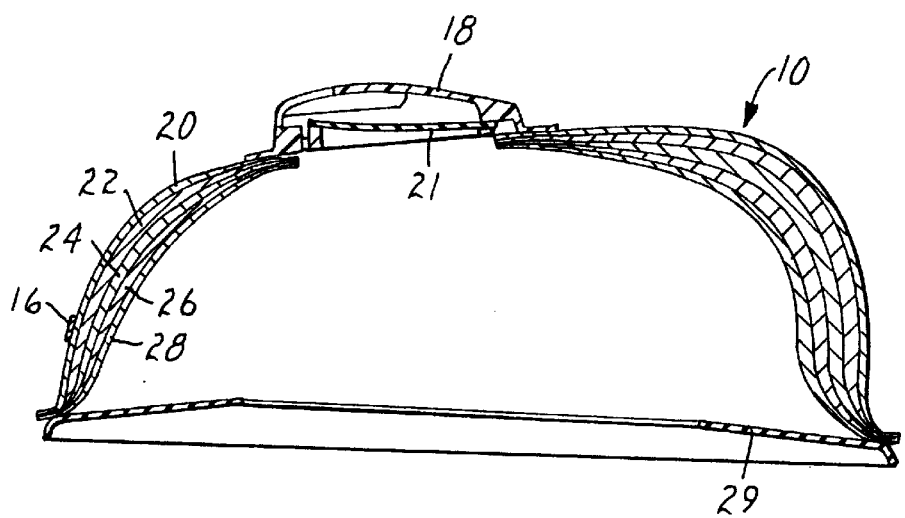
FIG. 2 is a sectional view along line 2—2 through the respirator shown in FIG. 1.

FIG. 2 illustrates a cross-section of the respirator of FIG. 1 taken along line 2—2. Outer shaping layer 20 is relatively stiff and helps the particle-containing layer maintain its cup-like shape, thereby enabling the respirator to fit over the mouth and nose of a typical wearer. Filter layer 22 entraps airborne particles and desirably is formed from a blown microfiber web having an electret charge. Filter layer 22 is air-permeable but capable of retaining any particles (not shown) which may accidentally become dislodged from sorbent-particle-containing layer 24. Air-permeable particle-retaining layer 26 also prevents inhalation of particles which may accidentally become dislodged from layer 24. Inner shaping layer 28 helps particle-containing layer 24 retain its cup-like shape. Outlet valve 21 permits the ready escape of air exhaled by the wearer. Facial gasket 29 improves the air seal between the respirator and the wearer's skin.

Figure 3:
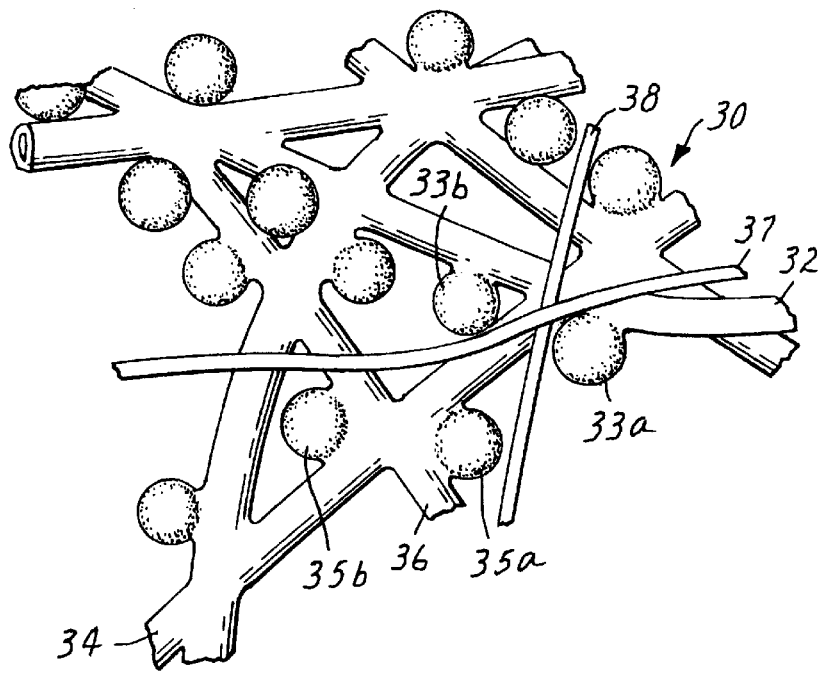
FIG. 3 is an enlarged cross-sectional view of a particle-loaded web for use in making respirators of the invention.

FIG. 3 illustrates a preferred particle-containing web 30 which can be used to make respirators of the invention. Web 30 is composed of sorbent particles such as particles 33a, 33b, 35a and 35b which are adhered to one or more of fibers 32, 34 and 36. Further fibers 37 and 38 are intermeshed with the sorbent particles but not adhered to them.

Figure 4:
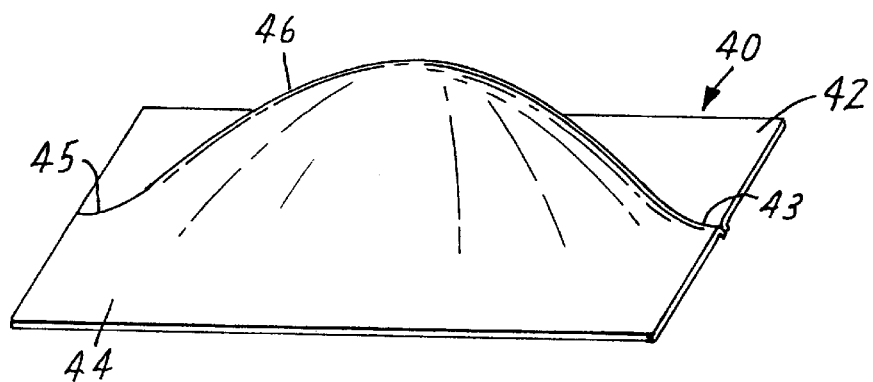
FIG. 4 is a perspective view of a particle-loaded web preform used to assemble respirators of the prior art.

FIG. 4 illustrates a typical particle-loaded web preform 40 used in prior art processes for assembling respirators. Preform halves 42 and 44 are joined at curved edges 43 and 45 along weld line 46. When laid on a flat surface, preform 40 does not lie flat but instead adopts a somewhat cup-like shape. This facilitates draping preform 40 over adjacent shaping and other layers to form the completed respirator. The cup-like shape of preform 40 enables the assembly operation to be carried out with minimal deformation of the particle-containing layer, thereby reducing web tearing, particle loss, particle consolidation, particle redistribution or the formation of thin spots. The process of the present invention permits elimination of the preform fabrication step and substitution of a generally flat particle-loaded web, thereby simplifying manufacturing and reducing material waste.

Figure 5:
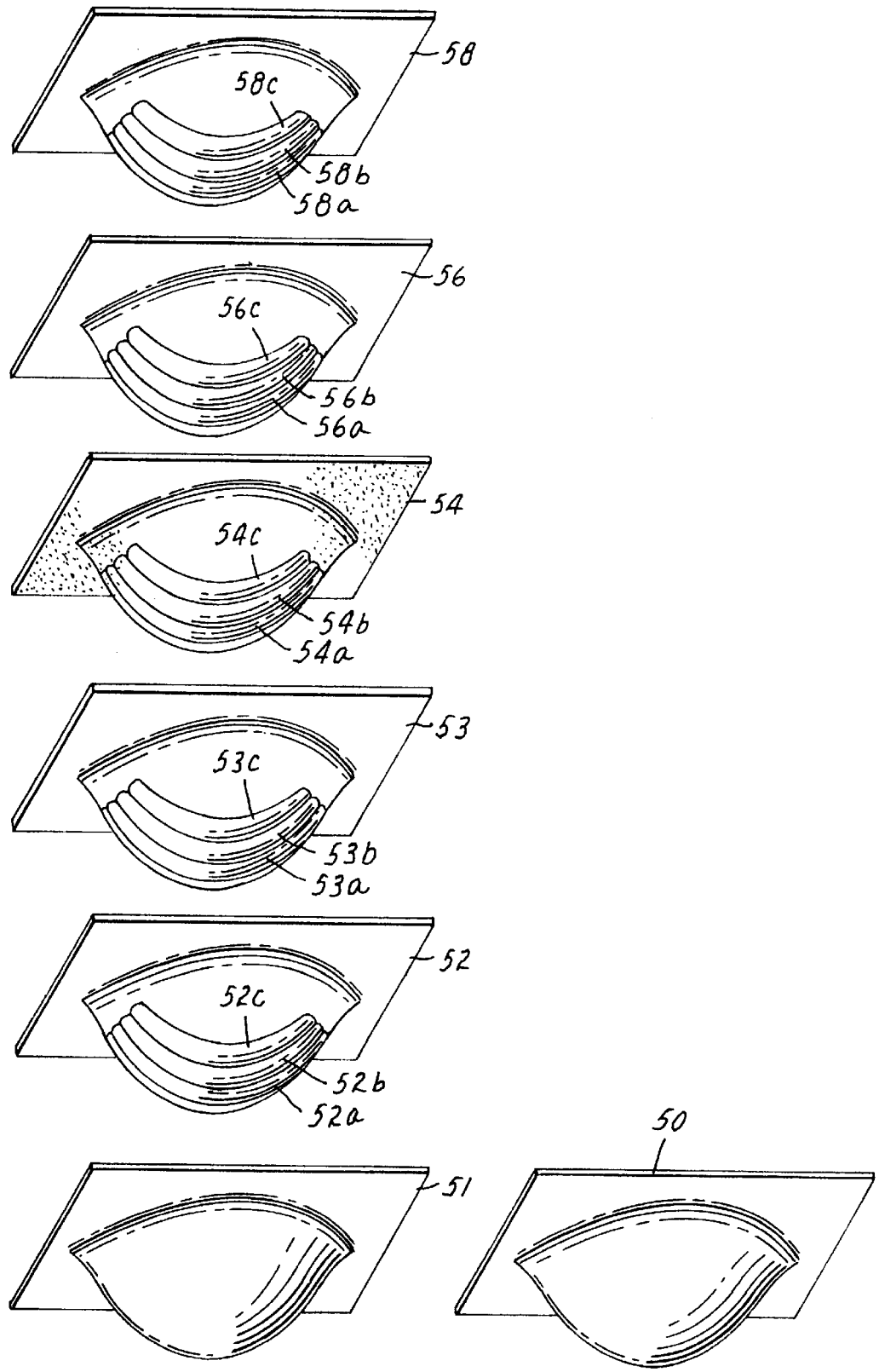
FIG. 5 is an exploded perspective view of molded layers which can be used to form a respirator of the invention.

FIG. 5 illustrates several layers which can be combined to form a respirator of the invention. The layers are shown in exploded view after they have been molded but before they have been fastened together by edge welding and trimmed to the desired final respirator configuration. Outer shaping layer 50 has a generally smooth outer surface and can be molded separately from the five molded layers 52, 53, 54, 56 and 58. Filtration layer 51 is fluffy and relatively formless and is draped between layers 50 and 52 during manufacture. Shaping layer 52 has molded ribs 52a, 52b and 52c. Charged electret filter layer 53 has molded ribs 53a, 53b and 53c, traps incoming particles carried in the airstream and prevents loss of particles from particle-containing layer 54. Particle-containing layer 54 has molded ribs 54a, 54b and 54c. Inner particle-retaining charged electret fiber layer 56 has molded ribs 56a, 56b and 56c, and prevents accidental inhalation of particles which may become dislodged from layer 54. Inner shaping layer 58 has molded ribs 58a, 58b, and 58c.

Figure 6:
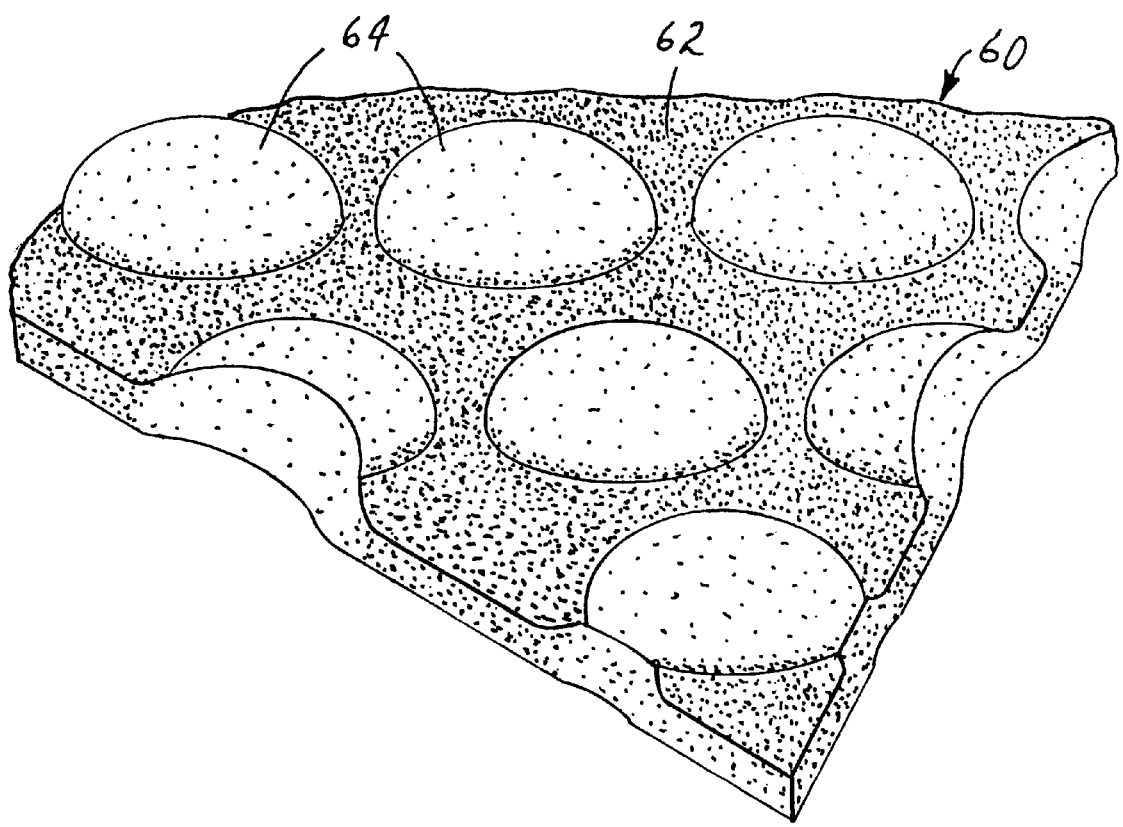
FIG. 6 shows a pillowed web which can also be used to make respirators of the invention.

FIG. 6 illustrates a representative pillowed particle-containing web 60 which can be used in respirators of the invention. Web 60 includes pillowed low-density regions 64 surrounded by compacted high-density region 62. Pillowed web 60 can be formed by modifying the procedure described in the above-mentioned U.S. Pat. No. 4,103,058 by incorporating sorbent particles within the web and by employing the materials and techniques described in more detail below to form a stretchable web in which at least some of the sorbent particles are adhered to the web.

The respirators of the invention maintain a generally non-planar configuration and do not lie flat when in an unconstrained state. They can be manufactured by fabricating multiple layers of air-permeable materials, forming the layers into the desired shape using, e.g., a molding process, optionally affixing the layers together to help maintain the desired shape using, e.g., an edge welding process, and attaching any other desired parts such as straps, exhalation valves and nosepieces. Features such as flexible tabs 15, noseband 16, exhalation valve 18 and facial gasket 29 of the respirator shown in FIGS. 1 and 2 can readily be omitted, but their inclusion helps the wearer achieve a comfortable, leak-free fit, and reduces condensation within the respirator or on the wearer's safety goggles or eyeglasses.

The respirator layers need not all have the same degree of air permeability. They merely should collectively be sufficiently permeable to permit relatively easy inhalation by the respirator wearer during the desired wearing period. Also, although the term "layer" is used to describe materials used to form the respirator, any layer may in fact be formed from several sublayers which have been combined to obtain a desired thickness or weight. The various enumerated layers of the respirator need not be located adjacent to one another. For example, the air-permeable particle-containing layer can be separated from one or both of the air-permeable particle-retaining layers by layers performing other functions.

The air-permeable particle-retaining layers can be the same as or different from one another. They should entrap or otherwise prevent the escape of sorbent particles which may accidentally become detached from the air-permeable sorbent-particle-containing layer. Desirably, one or more of the particle-retaining layers has a sufficient degree of filtration efficiency to enable it to entrap airborne particulates (e.g., particles or fibers) carried in the incoming ambient air or the outgoing exhaled air. Preferably one or more of the particle-retaining layers will entrap or otherwise capture particles having diameters as small as 100 micrometers, more preferably as small as 30 micrometers, and most preferably in submicron sizes. The particle-retaining layers preferably are arranged upstream and downstream from (i.e., with respect to the inhaled air flow) and adjacent to the particle-containing layer. A wide variety of materials can be used to form the air-permeable sorbent-particle-retaining layers. Webs made from nonwoven natural or synthetic fibers or mixtures thereof are preferred. Suitable natural fibers include wool, silk and cellulosic fibers such as cotton, wood or paper pulp. Suitable synthetic fibers include polyolefins such as polyethylene and polypropylene, polyesters, polyamides, and blends, laminates and copolymers thereof. "Copolymer" as used herein refers to polymers containing two or more monomers, including terpolymers, tetrapolymers, etc. Thermoplastic or non-thermoplastic materials can be employed, although thermoplastic materials are generally preferred in order to facilitate assembly of the respirator via welding. Woven or non-woven materials can be employed, with non-woven materials being preferred for most applications. Melt-blown or spunbond techniques can be employed to make such non-woven webs. Non-woven webs can also be prepared on a Rando Webber (Rando Corporation, Macedon, N.Y.) air-laying machine or on a carding machine. Preferably the filtration efficiency of the particle-retaining layer is enhanced by means such as incorporation of an electret charge. If the particle-retaining layer will merely entrap particles dislodged from the particle-containing layer, then the basis weight and material cost for the particle-retaining layer should in general be kept as low as possible. If, however the particle-retaining layer will also serve as a filtration layer, then the desired filtration efficiency should be used as a guide to choosing the desired web materials, basis weight and other web characteristics. For example, different particle-retaining filtration layers might be selected to conform to each of the nine current NIOSH certification requirements for non-powered air-purifying particulate respirators set out in 42 CFR Part 84, subpart K.

The air-permeable particle-containing layer should be stretchable during shaping to a cup-like shape without tearing or significant loss of particles. The layer can be elastomeric (i.e., capable of recovering its approximate original dimensions after being stretched by a specified amount below the breaking point) or it can exhibit dead stretch (i.e., capable of being stretched but then generally not returning td its approximate original dimensions). In general, particle-containing layers that exhibit dead stretch are preferred. Although on a microscopic level there will almost always be some degree of tearing, the air-permeable particle-containing layer should be should not exhibit visible tearing of the layer when stretched to the extent required for the actual respirator shaping operation. The actual shaping conditions will vary but for a molding operation will usually include factors such as molding temperature and pressure, cycle time, and mold topography. As a general guide for an inline molding operation intended to form a typical cup-shaped respirator, the particle-containing layer preferably exhibits at least about 25% elongation to break in both the machine and cross direction, and more preferably exhibits at least about 30%, most preferably at least about 50%, elongation to break in at least one of the machine and cross directions.

When stretched, the particle-containing layer also should not exhibit significant loss of particles. The actual level of permissible particle loss will vary depending upon the desired respirator configuration and intended service environment. For example, as a general guide for a respirator intended to be used in the presence of typical organic vapors, the respirator preferably retains sufficient particles during shaping so that when the respirator is evaluated using the n-hexane test method described below in Example 1, at least 60 minutes, and more preferably at least 90 minutes will elapse before a level of 10 ppm hexane can be detected inside the respirator. Particle retention can also be evaluated without the need to fabricate a finished respirator by using the shake test described below in Example 1 to evaluate the particle-containing web by itself Preferably, when evaluated using such a shake test, the particle-containing layer retains at least about 90 weight percent, and more preferably about 95 weight percent, and most preferably at least about 99 weight percent of the particles originally present in the layer when it was formed.

The particles preferably are adhered to the fibers in the particle-containing layer. The actual nature of the adhesion will depend on the particles and fibers that are employed and the manner in which the particles are introduced into the web. Adhered particles will desirably exhibit "area contact" with one or more adjacent fibers, that is, they will appear to make more than mere point contact at areas where a fiber may touch a particle. Often area contact will be indicated by the presence of necking as is shown, for example in FIG. 3 between fiber 32 and particle 33a.

At least some of the fibers in the particle-containing layer should exhibit sufficient tackiness after being formed by themselves into a particle-free web and cooled to room temperature (20° C.) so that the web will adhere to itself. This can be evaluated manually but should be carried out promptly after the web reaches room temperature. The cooled web can be folded over upon itself and then manually pulled apart to determine whether or not the web layers have adhered to one another.

The particle-containing layer desirably is formed using the apparatus discussed, for example, in Wente, Van A., "Superfine Thermoplastic Fibers", *Industrial Engineering Chemistry*, Vol. 48, pages 1342–1346; Wente, Van A. et al., "Manufacture of Superfine Organic Fibers", Report No. 4364 of the Navel Research Laboratories, published May 25, 1954; and in U.S. Pat. No. 3,825,379 (Lohkamp et al.) and U.S. Pat. No. 3,849,241 (Butin et al.). The microfine fibers described in these references are termed melt blown fibers and are generally substantially continuous and form into a coherent web between the exit die orifice and a collecting surface (the "collector") by entanglement of the microfibers due in part to the turbulent airstream in which the fibers are entrained. When formed by meltblown processes, the individual fibers generally have an effective fiber diameter about 100 microns or less in diameter, more preferably about 50 microns or less in diameter, and most preferably about 10 microns or less in diameter. The particle-containing layer can also be formed by other conventional melt spinning processes, such as spunbond processes. When formed by melt spinning processes, the fibers of the particle-containing layer preferably are about 100 microns or less in diameter.

The fibers in the particle-containing layer can include pressure-sensitive adhesive fibers that will impart durable tackiness to the particle-containing layer sufficient to enable a particle-free web formed from such fibers to adhere temporarily to itself. However, fibers that are not durable pressure-sensitive adhesives cAn also be employed, so long as the fibers are sufficiently tacky for a temporary period after a particle-free web is formed from such fibers on a collector and cooled to room temperature (e.g., for at least about 30 seconds, preferably for at least about two hours, and most preferably for at least about one or more days duration) so that the web will adhere to itself. For brevity, the pressure-sensitive adhesive fibers and the temporarily tacky fibers will be referred to collectively as "adhesive fibers".

The particle-containing layer preferably also includes non-adhesive fibrous material intimately commingled with the adhesive fibers to provide the layer as a whole with suitable tensile strength, breathability, moldability and other desired properties. The commingled adhesive fibers and non-adhesive fibrous material can be present in separate individual fibers, or as distinct regions in a conjugate fiber, or as part of a blend. For example, conjugate fibers can be in the form of two or more layered fibers, sheath-core fiber arrangements or in "island in the sea" type fiber structures. Generally with any form of multicomponent conjugate fibers, the adhesive fiber component will provide at least a portion of the exposed outer surface of the multicomponent conjugate fiber. Preferably, the individual components of the multicomponent conjugate fibers will be present substantially continuously along the fiber length in discrete zones, which zones preferably extend along the entire length of the fibers.

Conjugate fibers can be formed, for example, as a multilayer fiber as described, for example, in the above-mentioned U.S. Pat. No. 5,238,733, U.S. Pat. No. 5,601,851 (Terakawa), or International Application No. WO 97/2375. Multilayered and sheath-core melt blown microfibers are described, for example, in the above-mentioned U.S. Pat. No. 5,238,733, the substance of which is incorporated herein by reference in its entirety. The '733 patent describes providing a multicomponent melt blown microfiber web by feeding two separate flow streams of polymer material into a separate splitter or combining manifold. The split or separated flow streams are generally combined immediately prior to the die or die orifice. The separate flow streams are preferably established into melt streams along closely parallel flow paths and combined where they are substantially parallel to each other and the flow path of the resultant combined multilayered flow stream. This multilayered flow stream is then fed into the die or die orifices and through the die orifices. Air slots are disposed on either side of a row of die orifices directing uniform heated air at high velocities at the extruded multicomponent melt streams. The hot high velocity air draws and attenuates the extruded polymeric material which solidifies after traveling a relatively short distance from the die. The high velocity air becomes turbulent between the die and the collector surface causing the melt blown fibers entrained in the airstream mutually to entangle and form a coherent nonwoven web. The particulate materials described in more detail below are fed into the turbulent airstream thereby becoming incorporated into the coherent nonwoven web. This can be done, for example, by using a macrodropper or by other known methods. The resulting solidified or partially-solidified particle-containing layer is then formed at the collector by known methods.

Alternatively, conjugate fibers can be formed by a spunbond process such as described in U.S. Pat. No. 5,382,400 (Pike et al.) where separate polymer flow streams are fed via separate conduits to a spinneret for producing conjugate fibers of a conventional design. Generally, these spinnerets include a housing containing a spin pack with a stack of plates which form a pattern of openings arranged to create flow paths for directing the separate polymer components separately through the spinneret. The spinneret can be arranged to extrude the polymer vertically or horizontally in one or more rows of fibers.

An alternative arrangement for forming melt blown conjugate fibers is described for example, in the above-mentioned U.S. Pat. No. 5,601,851. The polymer flow streams are separately fed to each individual die orifice by the use of grooves cut in a distributing and/or separating plate. This arrangement can be used to extrude different polymers from different individual orifices to provide separate distinct fibers which form a coherent entangled web having a substantially uniform distribution of the different fibers. By feeding two, separate polymers to an individual die orifice a conjugate fiber can be formed. The apparatus described is suitably used in a melt blowing type arrangement where the die orifices are formed in a row along the die.

The adhesive fibers contain an extrudable pressure-sensitive adhesive material or temporarily tacky material suitable for melt blowing (e.g., a material having an apparent viscosity of from 150 to 800 poise under melt-processing conditions, measured by a capillary rheometer), fiber spinning or spunbond processing. With conjugate fibers or co-formed fibers of different polymers or blends formed from a single die or spinneret, the viscosities of the separate polymer flowstreams should be fairly closely matched for uniform fiber and web formation, but this is not required. In general, matching viscosities will ensure more uniformity in the conjugate fibers by minimizing polymer mixing, which mixing can result in fiber breakage and formation of shot (small particulate polymer material), and lower web tensile properties. However, the presence of discontinuous fibers or shot is not necessarily undesirable as long as the web has the desired overall tensile and cohesive strength.

The particular materials used to form the discrete adhesive fibers, conjugate fibers or blends (of either discrete or conjugate fibers) will depend on the desired respirator service application and, in the case of polymer blends or conjugate fibers, upon the chosen non-adhesive fibrous materials. The adhesive fiber material is preferably any hot melt extrudable copolymer or composition having a viscosity in the melt phase suitable for fiber forming by melt processing or in the solution phase for solution spun fibers. Suitable classes of adhesive fiber materials include stretchable block copolymers, acrylates, certain polyolefins, and a variety of other tacky or temporarily tacky adhesives. The temporarily tacky adhesives (for example polyalphaolefins, metallocene-catalyzed polyolefins and polyurethanes) provide surprisingly good particle retention, especially at effective fiber diameters above about 10 micrometers, and thus are preferred. "Effective fiber diameter", as used herein, is evaluated using the method of Example 1. Conventional blown microfiber materials lose the ability to retain particles as the fiber diameter increases. Because larger fibers yield webs with lower pressure drops, this use of temporarily tacky adhesive fibers permits preparation of filter webs having both good particle retention and low pressure drop.

Stretchable Block Copolymers

Suitable stretchable block copolymers would include those formed using a tackified elastomer where a preferred elastomer is an A-B type block copolymer wherein the A block and B blocks are configured in linear, radial or star configurations. The A block is formed of a mono-alkenylarene (preferably polystyrene) block having a molecular weight between 4000 and 50,000, and preferably between 7000 and 30,000. The A block content is preferably about 10 to 50 weight percent, and more preferably about 10 to 30 weight percent of the block copolymer. Other suitable A blocks may be formed from alpha-methylstyrene, t-butyl-styrene and other ring-alkylated styrenes, as well as mixtures thereof. The B block is formed of an elastomeric conjugated diene, generally polyisoprene, polybutadiene or copolymers thereof having an average molecular weight from about 5000 to about 500,000, and preferably from about 50,000 to about 200,000. The B block dienes can also be hydrogenated. The B block content is preferably about 90 to 50 percent, and more preferably about 90 to 70 weight percent of the block copolymer.

The tackifying components for the stretchable block copolymers generally are solid tackifying resins, liquid tackifiers, plasticizers or mixtures thereof. Preferably, the tackifying resins are selected from the group of resins at least partially compatible with the polydiene B block portion of the elastomer. Although not preferred, generally a relatively minor amount of the tackifying resin can include resins compatible with the A block, which when present are generally termed end block reinforcing resins. Generally, end block resins are formed from aromatic monomer species. Suitable liquid tackifiers or plasticizers for use in the adhesive polymer include napthenic oils, paraffin oils, aromatic oils, mineral oils or low molecular weight rosin esters, polyterpenes and C-5 resins. Some suitable B-block compatible solid tackifying resins include C-5 resins, resin esters, polyterpenes and the like. The tackified portion of the adhesive generally represents about 20 to 300 parts per 100 parts of the elastomeric phase. Preferably, this is predominately solid tackifier. However, from 0 to 25 weight percent, and preferably from 0 to 10 weight percent of the adhesive composition can be liquid tackifier or plasticizer.

Suitable stretchable block copolymers for melt blown processing are discussed in European Patent No. 0658351 which exemplifies melt-blown fibrous synthetic rubber resin type adhesives used in a disposable absorbent article to immobilize particulate sorbents or used as a pressure-sensitive adhesive attachment (e.g., for a sanitary napkin). Suitable adhesive materials exemplified therein include styrene-isoprene-styrene triblock block copolymers, where the copolymer has coupling efficiencies ranging from 42 to 65 percent (e.g., 58 to 35 percent polystyrene-polyisoprene diblock material would be present), tackified with C-5 hydrocarbon resins (e.g., "WINGTACK PLUS" and "WINGTACK 10" tackifiers from Goodyear) and stabilized with antioxidants. Other commercially available stretchable block copolymers include "KRATON" block copolymers such as "KRATON D1107", "KRATON D1112" and "KRA- TON G1657" block copolymers commercially available from Shell Chemical Co., "FINAPRENE" copolymers commercially available from Fina Oil and Chemical, "TAIPOL" styrene-butadiene stretchable block copolymers commercially available from Taiwan Synthetic Rubber Corporation, "SEPTON SEPS" triblock copolymer commercially available from Kuraray Co., and blends (including conjugate fibers) thereof.

Acrylates

Suitable acrylates would include poly(acrylates) derived from (i) at least one monofunctional alkyl (meth)acrylate monomer (i.e., alkyl acrylate or alkyl methacrylate monomer), and (ii) at least one monofunctional free-radically copolymerizable reinforcing monomer. The reinforcing monomer has a homopolymer glass transition temperature ($T_g$) higher than that of the monomer (i) and will increase the glass transition temperature and modulus of the resultant copolymer. Monomers (i) and (ii) are chosen such that a copolymer formed from them is extrudable and capable of forming fibers. Preferably, the monomers used in preparing the adhesive fibers include a monomer (i) that, when homopolymerized, generally has a glass transition temperature of no greater than about 0° C., and a monomer (ii) that, when homopolymerized, generally has a glass transition temperature of at least about 10° C. The glass transition temperatures of monomers (i) and (ii) are typically accurate to within ±50° C. and are measured by differential scanning calorimetry.

Monomer (i) contributes to the flexibility and tack of the copolymer. Preferably monomer (i) has a homopolymer $T_g$ of no greater than about 0° C. Preferably the alkyl group of monomer (i) has an average of about 4 to about 14 carbon atoms. The alkyl group can optionally contain oxygen atoms in the chain thereby forming ethers or alkoxy ethers, for example. Examples of monomer (i) include, but are not limited to, 2-methylbutyl acrylate, isooctyl acrylate, lauryl acrylate, 4-methyl-2-pentyl acrylate, isoamyl acrylate, sec-butyl acrylate, n-butyl acrylate, n-hexyl acrylate, 2-ethylhexyl acrylate, n-octyl acrylate, n-decyl acrylate, isodecyl acrylate, isodecyl methacrylate, and isononyl acrylate. Other examples of monomer (i) include, but are not limited to, poly-ethoxylated or -propoxylated methoxy (meth)acrylate (i.e., poly(ethylene/propylene oxide) mono-(meth)acrylate) macromers (also known as macromolecular monomers), polymethylvinyl ether mono(meth)acrylate macromers, and ethoxylated or propoxylated nonyl-phenol acrylate macromers. The molecular weight of such macromers is typically about 100 to about 600 grams/mole, and preferably, about 300 to about 600 grams/mole. They can perform the function of a crosslinker by forming physical crosslinks that result from the formation of reinforcing domains due to phase separation. Combinations of various monofunctional monomers categorized as monomer (i) can also be used in making the fibers used in the invention.

Reinforcing monomer (ii) increases the glass transition temperature and modulus of the resultant copolymer. Preferably monomer (ii) has a homopolymer $T_g$ of at least about 10° C. More preferably, monomer (ii) is a reinforcing monofunctional (meth)acrylic monomer, including an acrylic acid, a methacrylic acid, an acrylamide, and an acrylate. Examples of monomer (ii) include, but are not limited to, acrylamides, such as acrylamide, methacrylamide, N-methyl acrylamide, N-ethyl acrylamide, N-methylol acrylamide, N-hydroxyethyl acrylamide, diacetone acrylamide, N,N-dimethyl acrylamide, N,N-diethyl acrylamide, N-ethyl-N-aminoethyl acrylamide, N-ethyl-N-hydroxyethyl acrylamide, N,N-dimethylol acrylamide, N,N-dihydroxyethyl acrylamide, t-butyl acrylamide, dimethylaminoethyl acrylamide, N-octyl acrylamide, and 1,1,3,3-tetramethylbutyl acrylamide. Other examples of monomer (ii) include acrylic acid and methacrylic acid, itaconic acid, crotonic acid, maleic acid, fumaric acid, 2,2-(diethoxy)ethyl acrylate, hydroxyethyl acrylate or methacrylate, 2-hydroxypropyl acrylate or methacrylate, methyl methacrylate, isobutyl acrylate, n-butyl methacrylate, isobornyl acrylate, 2-(phenoxy)ethyl acrylate or methacrylate, biphenylyl acrylate, t-butylphenyl acrylate, cyclohexyl acrylate, dimethyladamantyl acrylate, 2-naphthyl acrylate, phenyl acrylate, N-vinyl pyrrolidone, and N-vinyl caprolactam. Combinations of various reinforcing monofunctional monomers categorized as monomer (ii) can also be used to make the adhesive fibers used in the invention.

The acrylate copolymer is preferably formulated to have a resultant $T_g$ of less than about 25° C. and more preferably, less than about 0° C. Such acrylate copolymers preferably include about 60 parts to about 98 parts per hundred of at least one alkyl (meth)acrylate monomer (i) and about 2 parts to about 30 parts per hundred of at least one copolymerizable reinforcing monomer (ii). Preferably, the acrylate copolymers have about 85 parts to about 98 parts per hundred of at least one alkyl (meth)acrylate monomer (i) and about 2 parts to about 15 parts of at least one copolymerizable reinforcing monomer (ii).

A crosslinking agent can be used if so desired to build the molecular weight and strength of the copolymer, and hence improve the integrity and shape of the adhesive fibers. Preferably the crosslinking agent is one that is copolymerized with monomers (i) and (ii). The crosslinking agent may produce chemical crosslinks (e.g., covalent bonds). Alternatively, it may produce physical crosslinks that result, for example, from the formation or reinforcing domains due to phase separation or acid base interactions. Suitable crosslinking agents are disclosed in U.S. Pat. No. 4,379,201 (Heilman), U.S. Pat. No. 4,737,559 (Kellen), U.S. Pat. No. 5,506,279 (Babu et al.) and U.S. Pat. No. 4,554,324 (Husman).

The crosslinking agent is preferably not activated towards crosslinking until after the copolymer is extruded and the fibers are formed. Thus, the crosslinking agent can be a photocrosslinking agent, which, upon exposure to ultraviolet radiation (e.g., radiation having a wavelength of about 250 nanometers to about 400 nanometers), causes the copolymer to crosslink. Preferably, however, the crosslinking agent provides crosslinking, typically, physical crosslinking, without further processing. Physical crosslinking can occur through phase separation of domains which produces thermally reversible crosslinks. Thus, acrylate copolymers prepared from a crosslinker that provides reversible physical crosslinking are particularly advantageous in the preparation of fibers using a melt process.

Preferably, the copolymerizable crosslinking agent is (1) an acrylic crosslinking monomer, or (2) a polymeric crosslinking material having a copolymerizable vinyl group. More preferably, the crosslinking agent is a polymeric crosslinking material having a copolymerizable vinyl group. Preferably, each of these monomers is a free-radically polymerizable crosslinking agent capable of copolymerizing with monomers (i) and (ii). Combinations of various crosslinking agents can be used to make the acrylate copolymer. It should be understood, however, that such crosslinking agents are optional.

The acrylic crosslinking monomer is preferably one that is polymerized with monomers (i) and (ii) and generates free radicals in the polymer backbone upon irradiation of the polymer. An example of such a monomer is an acrylated benzophenone such as described in the above-mentioned U.S. Pat. No. 4,737,559.

Crosslinking polymeric materials (2) that have a copolymerizable vinyl group can preferably be represented by the general formula X—(Y)$_n$—Z wherein X is a copolymerizable vinyl group; Y is a divalent linking group where n can be zero or one; and Z is a monovalent polymeric moiety having a T$_g$ greater than about 20° C. and a weight average molecular weight in the range of about 2,000 to about 30,000 and being essentially unreactive under copolymerization conditions. Particularly preferred vinyl-terminated polymeric monomers (2) useful in making the acrylate copolymers used in the invention may be further defined as having an X group of the formula HR$^1$C=CR$^2$— wherein R$^1$ is a hydrogen atom or a —COOH group and R$^2$ is a hydrogen atom or a methyl group; or a Z group of the formula —{C(R$^3$)(R$^4$)CH$_2$}$_n$—R$^5$ wherein R$^3$ is a hydrogen atom or a lower alkyl group, R$^4$ is a lower alkyl group, n is an integer from 20 to 500, and R$^5$ is a monovalent radical selected from the group consisting of —C$_6$H$_4$R$^6$ and —CO$_2$R$^7$ wherein R$^6$ is a hydrogen atom or a lower alkyl group and R$^7$ is a lower alkyl group.

Such vinyl-terminated polymeric crosslinking monomers are sometimes referred to as macromolecular monomers (i.e., "macromers"). Once polymerized with the (meth) acrylate monomer and the reinforcing monomer, a vinyl-terminated polymeric monomer of this type forms a copolymer having pendant polymeric moieties which tend to reinforce the otherwise soft acrylate backbone, providing a substantial increase in the shear strength of the resultant copolymer adhesive. Specific examples of such crosslinking polymeric materials are disclosed in U.S. Pat. No. 4,554,324 (Husman et al.).

If used, the copolymerizable crosslinking agent is used in a curatively effective amount, by which is meant an amount that is sufficient to cause crosslinking of the acrylate to provide the desired final adhesion properties in the particle-containing layer. Preferably, if used, the crosslinking agent is used in an amount of about 0.1 part to about 10 parts, based on the total amount of monomers.

If a photocrosslinking agent has been used, the adhesive in the form of fibers can be exposed to ultraviolet radiation having a wavelength of about 250 nm to about 400 nm. The radiant energy in this preferred range of wavelength required to crosslink the adhesive is about 100 milliJoules/square centimeter (mJ/cm$^2$) to about 1,500 mJ/cm$^2$, and more preferably, about 200 mJ/cm$^2$ to about 800 mJ/cm$^2$.

The acrylate copolymers used in the invention can be synthesized by a variety of free-radical polymerization processes, including solution, radiation, bulk, dispersion, emulsion, and suspension polymerization processes. Bulk polymerization methods, such as the continuous free radical polymerization method described in U.S. Pat. Nos. 4,619,979 or 4,843,134 (both to Kotnour et al.), the essentially adiabatic polymerization methods using a batch reactor described in U.S. Pat. No. 5,637,646 (Ellis), and the methods described for polymerizing packaged pre-adhesive compositions described in International Patent Application No. WO 96/07522 may also be utilized to prepare the acrylate polymer from which the adhesive fibers can be prepared. The acrylate copolymers can also include conventional additives such as tackifiers (wood rosin, polyesters, etc.), plasticizers, flow modifiers, neutralizing agents, stabilizers, antioxidants, fillers, colorants, and the like, as long as they do not interfere in the fiber-forming melt process. Initiators that are not copolymerizable with the monomers used to prepare the acrylate copolymer can also be used to enhance the rate of polymerization and/or crosslinking. These additives are incorporated in amounts that do not materially adversely affect the desired properties of the acrylate copolymers or their fiber-forming properties. Typically, they can be mixed into these systems in amounts of about 0.05 volume percent to about 25 volume percent of the adhesive composition.

Polyolefins

Suitable polyolefins would include tackified higher polyolefin elastomer adhesives (e.g., polybutylene adhesives), atactic or substantially atactic polypropylene, and amorphous polyalphaolefin polymers suitable for forming hot melt pressure-sensitive adhesives with or without added tackifier. Polyalphaolefins are preferred. Suitable polyalphaolefins are generally copolymers of a C$_3$ to C$_5$ linear alpha-olefin(s) and a higher (generally C$_6$ to C$_{10}$) alpha-olefin(s). Preferred are copolymers of polyolefins with polyhexene, polyheptene, polyoctene, polynonene and/or polydecene. Preferred polyalphaolefins are described in U.S. Pat. Nos. 3,954,697 and 4,072,812 (both to McConnell et al.) and U.S. Pat. No. 4,684,576 (Tabor) where the amorphous polyalphaolefin copolymers can be used without added tackifiers directly to form a pressure-sensitive adhesive. These amorphous copolymers generally have from 40 to 60 mole percent of the higher alpha olefin comonomer(s). However, suitable compatible tackifying resins and plasticizing oils can be used which generally correspond to those used to tackify the synthetic AB block copolymer elastomers described above. For example, suitable compatible liquid or solid tackifiers would include hydrocarbon resins, such as polyterpenes, C-5 hydrocarbbn resins, or polyisoprenes. Resin esters of aromatic or aliphatic acids would be suitable. If these tackifiers are used in sufficient amounts, the higher alpha olefin content can be as low as 15 mole percent and still provide suitable adhesive fibers.

Representative commercially-available polyolefins include "ASPUN 6805" and "ASPUN 6806" ethylene/octene copolymer, both available from Dow Chemical Co., "ENGAGE 8400" ethylene/octene copolymer available from DuPont Dow Elastomers, EXACT 4023" metallocene-catalyzed ethylene/butylene copolymer available from Exxon Chemical Co., "REXENE D100" "EASTOFLEX D127" and "EASTOFLEX E1200" polyalphaolefins, both available from Eastman Chemical Co., "VESTOPLAST V520" and "VESTOPLAST V750" polyalphaolefin, both available from Hüls America Inc., and blends (including conjugate fibers) thereof.

Other Tacky or Temporarily Tacky Adhesives

Other tacky or temporarily tacky adhesive materials for use in forming the particle-containing layer include polyurethanes such as "MORTHANE 440" and "MORTHANE 455" polyester-based polyurethanes, both available from Morton International, "PELLETHANE" polyester-based polyurethanes such as "PELLETHANE 2355-85ABR" polyurethane available from Dow Chemical Co., "ESTANE" polyurethanes such as "ESTANE 58238" and "ESTANE 58661" polyester-based polyurethanes, both available from B.F. Goodrich Specialty Plastics., polydiorganosiloxane polyurea copolymers of the type disclosed in copending U.S. patent application Ser. No. 08/980,925 filed Dec. 1, 1997, the disclosure of which is expressly incorporated herein by reference, and blends (including conjugate fibers) thereof.

Non-Adhesive Fibrous Material

As mentioned above, the particle-containing layer can include non-adhesive fibrous material, as separate individual fibers, or as distinct regions in a conjugate fiber, or as part of a blend. Suitable non-adhesive fibrous materials include lower polyolefins such as polyethylene and isotactic polypropylene, polyesters, polyamides, polystyrenes, and non-tacky polyurethanes.

The non-adhesive fibrous material generally represents from 0 up to about 90 percent of the basis weight of the fibers in the particle-containing layer, more preferably about 60 to about 80 percent. When the non-adhesive fibrous material is present as a discrete fiber, the fibers are generally intimately commingled with the adhesive fibers. Such commingled fibers can be formed from the die described in the above-mentioned U.S. Pat. No. 5,601,851 or in a separate die which could direct the non-adhesive fibrous material directly, or subsequently, into the fiber stream containing the adhesive fibers prior to formation of the commingled fiber web on the collector. The use of multiple dies for forming other types of commingled fibers is known in the art.

Generally, depending on the fiber formation process, suitable antioxidants and heat stabilizers could be used in the present invention to prevent the degradation of the particle-containing layer during the fiber forming process or in use. Also, other conventional additives could be used such as UV absorbents, pigments, particulates, staple fibers or the like.

A variety of particles can be employed in the particle-containing layer. Desirably the particles will be capable of absorbing or adsorbing gases, aerosols or liquids expected to be present under the intended service conditions. The particles can be in any useful form including beads, flakes, granules or agglomerates. Useful particles include activated carbon, alumina and other metal oxides, clay, hopcalite and other catalysts, ion exchange resins, molecular sieves and other zeolites, silica, sodium bicarbonate, biocides, fungicides and virucides. Activated carbon and alumina are preferred particles. Mixtures of particles can be employed, e.g., to absorb mixtures of gases, although in practice it generally is better to employ separate particle-containing layers to deal with mixtures of gases. The desired particle size will depend on the intended service conditions. As a general guide, particle sizes between about 30 and about 800 micrometers are preferred, and particle sizes between about 100 and about 300 micrometers are most preferred.

Preferably, the particles are present in amounts sufficient to provide the desired degree of filtration and absorption in the finished respirator. The precise amount will depend on factors such as the particle type and surface area and the desired pressure drop, service life and other relevant respirator properties. As a general guide, good results can be obtained using particle-containing layers having about 65 to 97%, more preferably about 70 to about 80% particles, compared to the total weight of the particle-containing layer. For webs containing carbon particles, the carbon weight is preferably about 50 to about 750 $g/m^2$, and more preferably about 50 to about 250 $g/m^2$.

Pillowed particle-containing webs can be used by adapting the manufacturing procedures described in the above-mentioned U.S. Pat. No. 4,103,058 (Humlicek), employing fibers that are sufficiently stretchable and by fabricating the web under conditions that will adhere the particles to the web. Pillowed webs exhibit particularly useful molding properties and are preferred for use in the respirators of the invention.

At least one of the respirator layers is a shape-retaining layer or "shaping layer". Shaping layers can serve as one or both of the particle-retaining layers. Often however a lower weight or lower cost respirator can be formed by using a separate shaping layer or layers whose shaping function is not compromised by the need to retain particles. However, the shaping layer can perform functions other than shaping, such as protection of the other layers of the respirator or prefiltration of a particulate stream. In some embodiments only one shaping layer need be included in the respirator, but shaping can be accomplished more durably and conveniently if two shaping layers are used, for example, inner and outer shaping layers as shown in FIGS. 2 and 5.

The shaping layer preferably contains fibers having bonding components which, after the particle-containing layer formed into a cup-like shape, will allow the fibers to be bonded to one another at points of fiber intersection. This can be accomplished, for example, by using fibers containing bonding components which allow adjacent contacting fibers to coalesce when subjected to heat and cooled. Such thermally bonding fibers typically come in monofilament and bicomponent form. Bicomponent fibers are the preferred fibers for use in forming shaping layers of this invention. Suitable bicomponent fibers include, for example, coextensive side-by-side configurations, coextensive concentric sheath-core configurations such as MELTY fibers from Unitika Limited, SOFFIT fibers from Kuraray (marketed in the US by Chori America, Inc.), and coextensive elliptical sheath-core configurations such as CHISSO ES from Chisso, Inc. (marketed in the US by Marubeni Corp.) One particularly useful bicomponent fiber for producing shaping layers has a generally concentric sheath-core configuration having a core of crystalline polyethylene terephthalate (PET) surrounded by a sheath of an amorphous copolyester. This bicomponent fiber is manufactured by Unitika Limited and is sold as MELTY Type 4080 fiber. Another particularly suitable bicomponent fiber is a concentric sheath/core fiber having a core of crystalline PET and a sheath of a modified copolyolefin (such as the copolymer described in the above-mentioned U.S. Pat. No. 4,684,576), for example, CEL-BOND Type 254 and 255 fibers made by Hoechst Celanese. The fibers in the shaping layer are usually between 1 and 200 denier and preferably average greater than 1 denier but less than 50 denier. In preferred embodiments, the shaping layer or layers contain a mixture of synthetic staple fiber (preferably crimped) and bicomponent binder fiber. Shaping layers which maintain low degrees of surface fuzz and provide a high degree of wearer comfort can be prepared as described in the above-mentioned U.S. Pat. No. 5,307,796.

Binder fibers are typically made from polymeric materials that soften and bond to other fibers when heated and cooled. Binder fibers will typically retain their fibrous structure after bonding. Examples of binder fibers are KODEL Type 444 fibers made by Eastman Chemical, and Type 259 fibers made by Hoechst Celanese. Upon heating of the non-woven web, the binder fibers soften and adhere to adjacent-contacting fibers. When the non-woven web is cooled in the molding step, bonds develop at fiber intersection points.

Bonding components such as acrylic latex may be applied to a web of fibers in order to form a shaping layer. Also, bonding components in the form of powdered heat-activatable adhesive resins may be cascaded onto a web of fibers, whereupon when the web is heated the fibers in the web become bonded together at intersection points by the added resin. Shaping layers of the invention preferably are free from such added bonding components because they increase material and processing costs and can contribute to increased flammability of the finished respirators.

Staple fibers suitable for use in forming respirator shaping layers are non-thermally bonding fibers, typically, synthetic single component fibers such as fibers made from polyethylene terephthalate (PET), nylon, and rayon. PET fibers (such as TREVIRA Type 121 and 295 fibers made by Hoechst Celanese) are preferred staple fibers.

The outer and inner shaping layers preferably contain a mixture of bicomponent fibers and staple fibers. For example, the outer shaping layer preferably contains about 70 weight-percent bicomponent fibers and about 30 weight-percent staple fibers, and the inner shaping layer preferably contains about 60 weight percent bicomponent fibers and 40 weight percent staple fibers. The outer shaping layer preferably provides a greater degree of support for the respirator than the inner shaping layer by having a greater basis weight or by containing a greater proportion of bicomponent fiber.

If only a low degree of filtration is needed, the respirators of the invention can employ the layers mentioned above without further filtration layers. The particle-retaining layers and the particle-containing layer typically will be capable of some degree of incoming and outgoing air filtration, and can screen out larger particles such as saliva from the wearer and relatively large particulate matter in the air. However, the respirators of the invention preferably also contain a filtration layer which entraps or otherwise prevents the ingress of undesired small particles such as sawdust, insulation materials, soot particles and the like. The fibers selected for use in a filtration layer will depend upon the kind of particulate to be filtered. Particularly useful filtration layers can be made from webs of melt-blown fibers, such as those disclosed in Wente, Van A., "Superfine Thermoplastic Fibers", id at 1342 et seq. Webs of meltblown fibers provide especially good filtration layers when used in a persistent electrically charged form as described, for example, in U.S. Pat. No. 4,215,682 (Kubik et al). Preferably, these melt-blown fibers have an average diameter of less than about 10 micrometers. Other particularly useful filtration fibers are electrically-charged-fibrillated-film-fibers as disclosed in U.S. Pat. No. RE 31,285 (Van Turnhout), and commercially-available filtration materials such as TECHNOSTAT Type E200 web from All Felt Products, Inc. Rosinwool fibrous webs and webs of glass fibers are also useful filtration layers, as are solution blown, or electrostatically sprayed fibers, especially in microfiber form.

Preferred respirators of this invention contain at least one filtration layer containing blown micro-fibers, preferably electrically-charged blown micro-fibers. The filtration layer preferably is disposed between two shaping layers and preferably is upstream, or both upstream and downstream, from the particle-containing layer. Most preferably the respirator contains two filtration layers, each of which is an electrically-charged web, located upstream and downstream from the particle-containing layer. The web from which one or more of the filtration layers are formed can optionally be heat set (e.g., at temperatures of 260° C. to 425° C.) using infrared heaters located above and below the web before it is combined with the other layers used to form the respirator.

The respirator layers can be formed into the desired final respirator configuration using conventional respirator manufacturing techniques. For example, the layers can be stacked together and molded at room or elevated temperatures between mating male and female molds. The various layers can be molded together all at once or in separate subassemblies which are later joined together. The mating mold halves need not match, and uniform or non-uniform mold gaps can be employed across the surface of the respirator. Mold gaps of, e.g., about 1 mm to about 8 mm can be employed, and may allow the various layers (e.g., the filter layer) to move within the mold without tearing the adjacent layers.

A variety of conventional assembly techniques can be used to join together the various layers to form the completed respirator. Useful techniques include ultrasonic welding, adhesive bonding, thermal bonding, needle tacking and stitched seams.

The invention will be further illustrated by the following examples, in which all parts and percentages are by weight unless otherwise indicated.

EXAMPLE 1 AND CONTROL EXAMPLE 1

A particle-loaded web was prepared as follows. The web was made from multi-layer melt-blown microfibers prepared as described in the above-mentioned U.S. Pat. No. 5,238,733. Two polymeric materials were separately introduced by separate extruders into a coextrusion feedblock. The first material was EASTOFLEX D127S amorphous polyolefin, obtained from Eastman Chemical Co. This material has pressure-sensitive adhesive properties and will be referred to as the PSA component. The second material was ESCORENE 3505 G isotactic polypropylene, obtained from Exxon Chemical Co., and will be referred to as the polypropylene component. The coextrusion feedblock split the PSA component into two flowstreams and combined them with the polypropylene component flowstream, forming a single layered flowstream having a layer of polypropylene sandwiched between top and bottom layers of the PSA. This layered flowstream was fed immediately into a melt-blowing die having circular smooth surface orifices with a 6.86:1 length to diameter ratio. The primary air was maintained at 285° C. and 151 KPa with a 0.076 cm gap width to produce a uniform web. The die was maintained at 285° C., and the die was operated at a rate of 187 g/hr/cm die width. The web was collected on a rotating drum collector at a collector to die distance of 30.4 cm.

Activated carbon particles were incorporated into the web by dropping them into the freshly blown stream of melt-blown fibers after the fibers exited from the die and before they reached the collector, using the general procedure described in U.S. Pat. No. 4,429,001 (Kolpin et al.). The particles were Calgon Activated Carbon, 40×140 mesh (105 micrometers to 379 micrometers), obtained from Calgon Carbon Corp., Pittsburgh, Pa. The resulting particle-loaded web contained bicomponent fibers having a generally layered PSA/polypropylene/PSA structure, and a composition of 76% polypropylene and 24% PSA. The web had a basis weight of 375 grams per square meter and contained 80% carbon particles and 20% bicomponent fibers.

Web samples were evaluated for effective fiber diameter according to the method set forth in Davies, C. N., "The Separation of Airborne Dust and Particles," Institution of Mechanical Engineers, London, Proceedings 1B, 1952.

Web samples 2.54 cm in width were evaluated for tensile strength and % elongation to break in both the machine and cross-web directions using a Texture Analyzer Model TA-XT2 operated at a 10 mm/sec crosshead speed using an 80 mm gauge length.

Web samples were also evaluated for particle retention using a shake test performed as follows. The sample web was placed atop a sheet of paper and three 171.5 mm circular samples of both the web and paper were cut using a circular die. The paper collected any particles (e.g., carbon) that fell from the samples during the subsequent weighing step. Taking care to minimize the overall amount of sample handling, the samples and any particles that had collected on the paper were weighed together. The samples were placed in three standard sieves (of any size between US Standard No. 8 and No. 14). Each sample was affixed in a sieve using four twisted paper clips that were spaced equally around the circumference of the sample, threaded through the sieve screen, and folded over to pierce and anchor the sample to the screen. Twenty US pennies were placed atop each sample to act as impact media. Each sieve was then stacked atop a fresh sieve whose interior had been lined with paper to serve as a carbon collection surface. The three sets of sample and collector sieves were stacked one atop another to form a stack containing six sieves. The stack was capped with a lid and a base and agitated in a Model B RoTap Testing Sieve Shaker (Tyler Industrial Products) for ten minutes. The samples were removed and reweighed, and the weight percent of retained particles calculated. Because samples at the top of the sieve stack had a tendency to lose more particles than samples at the bottom of the stack, the average of the three samples was used to determine particle loss.

Shaping layers were made on a Double Rando Webber air-laying machine by combining 65% Type 254 bicomponent fibers, 15 denier (Hoechst-Celanese Corp.) with 35% Type 295 staple fibers, 15 denier (Hoechst-Celanese Corp.) Each shaping layer had a basis weight of 63 grams per square meter.

A filter layer having an electret charge was prepared from a blown microfiber web made from ESCORENE 3505 G polypropylene (Exxon Chemical Co.) and having a basis weight of 56 grams per square meter. The web was charged by subjecting it to a corona discharge treatment followed by impingement of jets of water as described in U.S. Pat. No. 5,496,507 (Angadjivand et al.).

A molded respirator was then prepared by stacking one of the shaping layers, the particle-loaded web, the filter layer having an electret charge, layer having an electret charge, and the other shaping layer. This was accomplished while forming the shaping layers on the Double Rando Webber machine, by feeding the particle-loaded web and the electret filter web between the two shaping layers.

A respirator was molded from the stacked assembly of webs using the general procedure described in the above-mentioned U.S. Pat. No. 4,536,440. The molds were heated to a temperature of 114–118° C., and the web assembly was compressed to a mold gap of 0.13 cm. The dwell time was 12–15 seconds. The molded respirators were inspected for signs of web separation or tearing, and none was observed. Two further layers were added to the respirator. The outermost layer was a flame-retardant shaping layer made by combining 40% Type 295 polyester staple fibers, 15 denier (Hoechst-Celanese Corp.), 40% polyester staple fibers, 50 denier, and 20% Type 259 binder fibers, 3 denier (Hoechst-Celanese Corp.) and coating the resulting web with "FYARESTOR 330B" flame retardant (PYRO-CHEK Division of Ferro Corporation) at an add-on weight of 37.5% of the total web weight. The finished web had a basis weight of 180 grams per square meter. Under the outermost layer was placed a prefiltration layer made by combining 50% Type 180 polyester staple fibers, 1.35 denier (Hoechst-Celanese Corp.) with 50% 7 micrometer average diameter blown microfibers. The resulting web had a basis weight of 200 grams per square meter. The two layers were ultrasonically welded to the respirator and excess material trimmed away.

Samples of the molded respirators were evaluated against an ozone challenge as follows. The respirator sample was mounted on a breathing machine operating at 24 strokes per minute and a 40 liter per minute flow rate through the respirator. The respirator was exposed to an atmosphere containing 5 ppm ozone (generated using an Orec Model 03V1-0 Ozone Generator) at 50% Relative Humidity (±3%) and 35° C. (±2° C.). Ozone penetrating through the respirator was detected with a Dasibi Model 1003-AH Ozone Monitor. The ozone level in parts per million (ppm) was measured 48 minutes after the start of the evaluation.

Samples of the molded respirators of the invention were evaluated against an organic vapor (OV) challenge, using n-hexane as the organic vapor. A respirator sample was mounted on the above-described breathing machine and exposed to an atmosphere containing 60 ppm n-hexane at 50% Relative Humidity (±3%) and 35° C. (±2° C.). The flow rate through the respirator was 20 liters per minute. Hexane penetration through the respirator was detected with an HNU Model PI-201 Photoionization Monitor. The time in minutes required to detect 10 ppm hexane inside the respirator chamber was recorded.

Comparison respirators (identified in the table below as "Control 1") were formed largely from the same layers and similarly evaluated. However, in place of the particle-containing layer the respirators were fabricated using a preform prepared according to the general procedure of Example 22 of the above mentioned U.S. Pat. No. 4,807,619 and containing 128 grams per square meter of carbon particles.

The resulting evaluation data is set out below in Table 1:

TABLE 1

| Respirator | Example 1 | Control 1 |
| --- | --- | --- |
| Basis Weight, g/m$^2$, particle-containing layer | 375 | 160 |
| Wt. % particles in particle-containing layer | 80 | 80 |
| Effective fiber diameter, μm | 10.9 | 8.0 |
| MD Elongation, % | 11.9 | 3.2 |
| CD Elongation, % | 58.3 | 4.2 |
| MD Tensile, g | 1017 | 513 |
| CD Tensile, g | 1060 | 331 |
| % Particles retained in shake test | 99.2 | 83.8 |
| Ozone level, ppm | 0.064 after 48 minutes | 0.100 after 5 minutes |
| Hexane level, time to detect 10 ppm, minutes | 138 | 29 |

EXAMPLE 2

In this example, a particle-loaded web was prepared as in Example 1 using alumina particles instead of activated carbon. The alumina particles were obtained from Rhone-Poulenc, Inc., Monmouth Junction, N.J. and had a particle size distribution of 36 to 297 micrometers. The particle-loaded web had a basis weight of 220 grams per square meter and the alumina particles were 65% of the total web weight.

The particle-containing web was assembled with a flame-retardant shaping layer, a prefiltration layer, shaping layers and filtration webs as described in Example 1. The molded respirators were inspected for signs of web separation or tearing, and none was observed.

Samples of the molded respirators were evaluated with a hydrogen fluoride challenge as follows. The respirator was mounted on a breathing machine as in Example 1 with a flow rate through the respirator of 64 liters per minute and challenged with an atmosphere containing 70 ppm hydrogen fluoride and 50% Relative Humidity (±3%) and 23° C. (±2° C.). Hydrogen fluoride in the respirator cavity was measured with a Sensidyne HF Detector. The time required to detect 3 ppm hydrogen fluoride in the respirator cavity was recorded. Times greater than 30 minutes are considered passing under 42 CFR §84.190. The average measured time for the molded respirator samples was 183 minutes.

In an effort to determine whether molding the respirators had stretched the particle-containing web close to its breaking point, strips of the molded respirator were cut out, and the particle-containing layer was removed and evaluated for percent elongation before break as in Example 1. The elongation to break in the machine direction was 11.8% and in the cross direction it was 45.5%.

EXAMPLE 3

A particle-loaded web was prepared as in Example 2 except the basis weight was increased to 309 grams per square meter by lowering the collector speed. The percent load was 62% alumina particles. The particle-containing web was assembled with a flame-retardant shaping layer, a prefiltration layer, shaping layers and filtration webs as described in Example 1. No sign of web separation or tearing was observed.

The respirators were evaluated as in Example 2. The time required to detect 3 ppm hydrogen fluoride in the respirator cavity in the hydrogen fluoride challenge test was 235 minutes, compared with a minimum satisfactory time of 30 minutes. The percent elongation of the particle-containing layer after molding was 10.2% in the machine direction and 42.8% in the cross direction.

EXAMPLE 4

A particle-loaded web was prepared as described in Example 1 except the basis weight of the web was increased by lowering the collector speed. The basis weight of the web was 473 grams per square meter and the activated carbon was 68% of the weight of the web. The effective fiber diameter was 10.9 micrometers. Using the shake test of Example 1, 99.4% of the carbon particles were retained on the web. The particle-containing web was assembled with a flame-retardant shaping layer, a prefiltration layer, shaping layers and filtration webs as described in Example 1. No sign of web separation or tearing was observed.

Samples of the molded respirators were evaluated as described in Example 1 for ozone resistance, organic vapor resistance, and pressure drop. The ozone level was 0.02 ppm after 48 minutes and the time to detect 10 ppm hexane was 168 minutes. The pressure drop at a flow rate of 85 liters per minute was 10.2 mm $H_2O$.

EXAMPLES 5–6

Particle-loaded webs were prepared as described in Example 1 except that the activated carbon had a smaller average particle size, namely 80×325 mesh (46 to 187 micrometers). The basis weights, percent particles and shake test results for the particle-containing webs are given in Table 2. The particle-containing web was assembled with a flame-retardant shaping layer, a prefiltration layer, shaping layers and filtration webs as described in Example 1. No sign of web separation or tearing was observed.

The molded respirators were evaluated for ozone resistance, organic vapor resistance, and pressure drop. Strips were cut from the respirators in both the machine direction and cross-direction in which the particle-containing layer had been made. The elongation to break and the tensile strength of the particle-containing layer after molding were measured and are shown in Table 2.

TABLE 2

| Example | 5 | 6 |
|---|---|---|
| Basis Weight, g/m², particle-containing layer | 388 | 500 |
| % Particles | 73.4 | 73.3 |
| % Particles retained in shake test | 99.3 | 99.1 |
| Ozone level, ppm after 48 minutes | 0.012 | 0.009 |
| Hexane level, time to detect 10 ppm, minutes | 174 | 183 |
| Pressure drop, mm $H_2O$ | 12.6 | 19.8 |
| MD Elongation, % | 10.6 | 12.0 |
| CD Elongation, % | 23.4 | 22.1 |
| MD Tensile, g | 1129 | 1991 |
| CD Tensile, g | 1050 | 1668 |

EXAMPLE 7

A particle-loaded web was prepared as described in Example 1 except the web was collected on a perforated collector having circular openings, producing a web with a pillowed configuration like that shown in FIG. 6. The diameter of the perforations was 0.79 cm. and the land area was 44.75%. The collector was approximately 18 cm. from the die. The basis weight of the web was 392 g/² and the activated carbon was 70% of the weight of the web. When evaluated using the shake test of Example 1, 97% of the particles were retained in the web. The particle-containing web was assembled with a flame-retardant shaping layer, a prefiltration layer, shaping layers and filtration webs as described in Example 1. No sign of web separation or tearing was observed.

Samples of the molded respirators were evaluated as described in Example 1 for ozone resistance, organic vapor resistance, and pressure drop. The ozone level was 0.007 ppm after 48 minutes and the time to detect 10 ppm hexane was 161 minutes. The pressure drop at a flow rate of 85 liters per minute was 8.5 mm $H_2O$.

Strips were cut from the respirators in both the machine direction and cross direction in which the particle-containing layer had been made. The particle-containing layer had become flattened during the molding process and had lost much but not all of its pillowed appearance. The elongation to break of the particle-containing layer was in the machine direction was 9% and in the cross direction it was 36.5%. The tensile strength was 1482 grams in the machine direction and 796 grams in the cross direction.

EXAMPLES 8–10

Particle-loaded webs were prepared as described in Example 1 except the polymeric material was a single component and the polymer was fed from the extruder directly into the die. In Example 8 the polymer was EXACT 4023 metallocene-catalyzed ethylene/butylene copolymer from Exxon Chemical Co. In Example 9 the polymer was MORTHANE 440-200 polyurethane from Morton International and in Example 10 the polymer was MORTHANE 455-200 polyurethane from Morton International. The basis weights and particle percentages of the webs are shown in Table 3. Strips were cut from the unmolded webs in both the machine direction and cross direction. The elongation to break and the tensile strength of the webs were measured and are shown in Table 3.

TABLE 3

| Example | 8 | 9 | 10 |
|---|---|---|---|
| Polymer | EXACT 4023 ethylene/butylene copolymer | MORTHANE 440 polyurethane | MORTHANE 455 polyurethane |
| Basis Weight, g/m², particle-containing layer | 128 | 136 | 92 |
| % Particles | 52 | 64 | 46 |
| MD Elongation, % | 79.4 | 79.7 | 79.3 |
| CD Elongation, % | 79.5 | 79.8 | 79.8 |
| MD Tensile, g | 138 | 212 | 181 |
| CD Tensile, g | 117 | 156 | 133 |

EXAMPLE 11

A particle-loaded web was prepared as described in Example 1 except the amorphous polyolefin was EASTOFLEX 1200 from Eastman Chemical Co. The web had a basis weight of 300 grams per square meter and contained 80% carbon particles and 20% bicomponent fibers. The particle-containing web was assembled with a flame-retardant shaping layer, a prefiltration layer, shaping layers and filtration webs as described in Example 1. No sign of web separation or tearing was observed.

Samples of the molded respirators were evaluated as described in Example 1 for ozone resistance and organic vapor resistance. The ozone level was 0.04 ppm after 48 minutes and the time to detect 10 ppm hexane was 89 minutes.

EXAMPLE 12

A particle-loaded web was prepared from commingled fibers using two separate extruders and dies arranged to blend their outputs and form a single web. The first extruder contained EASTOFLEX E1200 amorphous polyolefin and the second extruder contained ESCORENE 3505 G polypropylene. The molten extrudates were fed to conventional Naval Research Lab melt-blowing dies having circular smooth surface orifices with a 20:1 length to diameter ratio. The primary air was maintained at 252° C. and 24.8 KPa with a 0.0381 cm gap width. Both dies were maintained at 316° C. The amorphous polyolefin die was operated at a rate of 107 g/hr/cm die width, and the polypropylene die was operated at a rate of 428 g/hr/cm die width. Calgon Activated Carbon particles (40×140 mesh) were dropped into blown streams of microfibers after they exited the dies and before the fibers reached the rotating drum collector. The collector to die distance was 30.4 cm. The resulting particle-containing layer had a basis weight of 300 grams per square meter and an effective fiber diameter of about 10 micrometers, and contained about 76% carbon particles and 24% commingled fibers, with 18% of the commingled fibers being polyalphaolefin and 82% being polypropylene. The particle-containing web was assembled with a flame-retardant shaping layer, a prefiltration layer, shaping layers and filtration webs as described in Example 1. No sign of web separation or tearing was observed. Samples of the molded respirators were evaluated as described in Example 1 for ozone resistance and for organic vapor resistance. After 48 minutes the ozone level reached 0.045 ppm, and the time to detect 10 ppm hexane was 79 minutes.

EXAMPLES 13–23 AND CONTROL EXAMPLES 2–13

Using the method of Example 1, two series of particle-containing webs having varying effective fiber diameters were prepared and evaluated for particle retention. The first series (identified in Table 4 below as Examples 13–23) employed adhesive fiber materials, and the second series (identified in Table 4 below as Control 2–13) employed non-adhesive fiber materials. Each of the webs contained carbon particles, in various mesh sizes. Set out in Table 4 below is the Example number or Control Example number, the fiber material (identified in greater detail in the key below the table), the carbon mesh size, initial weight percent carbon, percent carbon retained in the shake test, and the effective fiber diameter for each web.

TABLE 4

| | Fiber Material | Carbon Mesh Size | Initial % Carbon | % Carbon retained in shake test | Effective fiber diameter, μm |
|---|---|---|---|---|---|
| Example 13 | E4023 | 40 × 140 | 80.0 | 99.8 | 19.5 |
| Example 14 | E1200 | 40 × 140 | 81.5 | 95.4 | 19.8 |
| Example 15 | E1200 | 80 × 325 | 80.0 | 99.7 | 19.8 |
| Example 16 | PUR440 | 40 × 140 | 77.3 | 98.5 | 22.3 |
| Example 17 | PUR440 | 80 × 325 | 70.6 | 92.4 | 22.3 |
| Example 18 | PUR440 | 12 × 20 | 80.9 | 93.9 | 24.5 |
| Example 19 | E1200 | 40 × 140 | 81.0 | 99.7 | 27 |
| Example 20 | E1200 | 80 × 325 | 77.0 | 99.8 | 27 |
| Example 21 | PUR455 | 40 × 140 | 76.2 | 99.3 | 35 |
| Example 22 | PUR455 | 80 × 325 | 66.7 | 98.3 | 35 |
| Example 23 | PUR455 | 12 × 20 | 80.2 | 97.7 | 37.5 |
| Control 2 | F3860 | 40 × 140 | 77.8 | 83.8 | 6.4 |
| Control 3 | E3795 | 80 × 325 | 81.5 | 91.0 | 6.5 |
| Control 4 | E3795 | 40 × 140 | 81.5 | 93.6 | 7.7 |
| Control 5 | E3795 | 80 × 325 | 82.6 | 93.9 | 7.7 |
| Control 6 | E3795 | 12 × 20 | 80.3 | 86.7 | 7.8 |
| Control 7 | E3795 | 80 × 325 | 79.0 | 86.0 | 8.5 |
| Control 8 | E3795 | 80 × 325 | 79.2 | 92.1 | 8.6 |
| Control 9 | E3795 | 40 × 140 | 80.2 | 88.1 | 16.6 |
| Control 10 | E3795 | 80 × 325 | 78.6 | 80.5 | 16.6 |
| Control 11 | E3795 | 12 × 20 | 80.0 | 77.5 | 17.3 |
| Control 12 | E3505 | 80 × 325 | 80.3 | 72.6 | 21.0 |
| Control 13 | F3860 | 80 × 325 | 80.0 | 65.5 | 26.5 |

Key to fiber material entries in Table 4:
 "E1200" is EASTOFLEX polyalphaolefin from Eastman Chemical Co.
 "E3505" is ESCORENE 3505 G isotactic polypropylene from Exxon Chemical Co.
 "E3795" is ESCORENE 3795 G isotactic polypropylene from Exxon Chemical Co.
 "E4023" is EXACT 4023 metallocene-catalyzed ethylene/butylene copolymer from Exxon Chemical Co.

Key to entries in Table 4, continued:
 "F3860" is isotactic polypropylene from Fina Oil and Chemical.
 "PUR440" is Morthane 440-200 polyurethane from Morton International.
 "PUR455" is Morthane 455-200 polyurethane from Morton International.

The above data illustrates that particle-containing webs made from adhesive fibers provided very good particle retention even at large effective fiber diameters. This can be better appreciated by plotting effective fiber diameter against % particle retention, with the effective fiber diameter on the abscissa and % particle retention on the ordinate. The plot for Example Nos. 13–23 yielded a line having the equation:

$$\% \text{ particle retention} = 0.0447 * (\text{Effective Fiber Diameter}) + 96.70$$

The relatively flat slope of this line illustrated the insensitivity of the webs to particle loss at high effective fiber diameters. In contrast, preparation of a similar plot for the webs made from non-adhesive fibers (Control Examples 2–13) yielded a line having the equation:

% particle retention=−1.151*(Effective Fiber Diameter)+98.78

The considerably more negative slope of this latter line illustrated the tendency of the control webs to undergo substantial particle loss at large effective fiber diameters.

EXAMPLES 24–25

Two particle-loaded webs were prepared as described in Example 1 except the polyolefin was EASTOFLEX 1200 polyalphaolefin from Eastman Chemical Co., the polypropylene was ESCORENE 3795 from Exxon Chemical Co. and the polyolefin and polypropylene were combined in a 50:50 ratio. Both webs were loaded to a level of 90% with KURARAY TF 25×45 mesh carbon from Kuraray Chemical Co. The webs were evaluated for effective fiber diameter, carbon retention using the shake test of Example 1, and pressure drop at a face velocity of 2 meters/second. The results are set out below in Table 5.

TABLE 5

| Example | 24 | 25 |
|---|---|---|
| Basis Weight, g/m$^2$, particle-containing layer | 485 | 439 |
| Effective fiber diameter, μm | 22 | 35 |
| % Particles retained in shake test | 91 | 87 |
| Pressure drop, mm H$_2$O | 21.3 | 8.0 |

The above data illustrates that the particle-containing layer exhibited excellent particle retention even at very large effective fiber diameters, and low pressure drop even at high carbon loading levels.

Various modifications and alterations of this invention will be apparent to those skilled in the art without departing from the scope and spirit of this invention. It should be understood that this invention is not limited to the illustrative embodiments set forth above.

What is claimed is:

1. A method for making a respirator having an air-permeable sorbent-particle-containing layer and air-permeable particle-retaining layers, at least one of the layers of such respirator being a shape-retaining layer, comprising the steps of:

a) forming such particle-containing layer from thermoplastic fibers and such particles, the fibers being sufficiently tacky after being formed by themselves into a particle-free web and cooled to room temperature so that the web will adhere to itself;

b) combining such particle-containing layer with the particle-retaining layers so that the particle-containing layer is between the particle-retaining layers; and c) forming such layers to a generally cup-like shape, wherein the particle-containing layer is stretchable during shaping to such cup-like shape without tearing or significant loss of particles.

2. A method according to claim 1, wherein the fibers of the particle-containing layer have an effective fiber diameter less than about 10 micrometers.

3. A method according to claim 1, wherein the particle-containing layer, if shaken on a sieve shaker in the presence of impact media, will retain at least about 90 weight percent of the particles originally present in the web and the fibers of the particle-containing layer have an effective fiber diameter greater than about 10 micrometers.

4. A method according to claim 1, wherein the fibers of the particle-containing layer comprise a stretchable block copolymer resin, an acrylate, a polyolefin or a polyurethane.

5. A method according to claim 4, wherein the fibers of the particle-containing layer comprise a polyalphaolefin, a metallocene-catalyzed polyolefin or a polyurethane.

* * * * *

UNITED STATES PATENT AND TRADEMARK OFFICE
CERTIFICATE OF CORRECTION

PATENT NO.    : 6,234,171 B1                                Page 1 of 1
DATED         : May 22, 2001
INVENTOR(S)   : James E. Sprigett et al.

It is certified that error appears in the above-identified patent and that said Letters Patent is hereby corrected as shown below:

Column 5,
Line 1, "td" should read as -- to --.
Line 5, delete "should be".

Column 6,
Line 17, "cAn" should read as-- can --.

Column 9,
Line 28, "±50° should read as -- ± 5° --.

Column 17,
Line 34, delete "layer having an electret charge."

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*